United States Patent
Bailey et al.

(10) Patent No.: US 10,542,607 B2
(45) Date of Patent: Jan. 21, 2020

(54) WIRELESS RADIO CONTROL FOR SENSORS

(71) Applicant: Hubbell Incorporated, Shelton, CT (US)

(72) Inventors: Christopher Lane Bailey, Greenville, SC (US); Tim Willis, Clemson, SC (US); Pritam Yadav, Greenville, SC (US)

(73) Assignee: Hubbell Incorporated, Shelton, CT (US)

(*) Notice: Subject to any disclaimer, the term of this patent is extended or adjusted under 35 U.S.C. 154(b) by 0 days.

(21) Appl. No.: 16/161,924

(22) Filed: Oct. 16, 2018

(65) Prior Publication Data
US 2019/0124751 A1    Apr. 25, 2019

Related U.S. Application Data

(60) Provisional application No. 62/576,332, filed on Oct. 24, 2017.

(51) Int. Cl.
| G08B 1/08 | (2006.01) |
| H05B 37/02 | (2006.01) |
| H01H 9/22 | (2006.01) |

(52) U.S. Cl.
CPC ..... *H05B 37/0272* (2013.01); *H05B 37/0227* (2013.01); *H01H 9/22* (2013.01)

(58) Field of Classification Search
CPC .. H05B 37/0272; H05B 37/0227; H01H 9/22; G08B 13/196; G08B 25/06; G08B 13/19; G08B 13/1645; G08B 13/19697; G08B 25/10; Y10T 307/766

USPC ......... 340/539.1, 541, 540, 545.3, 565, 566, 340/567

See application file for complete search history.

(56) References Cited

U.S. PATENT DOCUMENTS

| 4,168,410 | A | | 9/1979 | Norris | |
| 4,703,171 | A | * | 10/1987 | Kahl | G08B 13/19 250/221 |
| 6,324,008 | B1 | * | 11/2001 | Baldwin | G01K 1/16 250/353 |
| 8,456,318 | B2 | | 6/2013 | Bender et al. | |
| 9,671,526 | B2 | | 6/2017 | Kumar | |
| 2003/0018398 | A1 | | 1/2003 | Juntunen et al. | |
| 2006/0049946 | A1 | | 3/2006 | Sullivan et al. | |
| 2006/0266949 | A1 | | 11/2006 | Bender et al. | |
| 2011/0301776 | A1 | * | 12/2011 | Goyal | H05B 37/0227 700/296 |
| 2013/0300584 | A1 | | 11/2013 | Morin | |

(Continued)

FOREIGN PATENT DOCUMENTS

| WO | WO996033478 | 10/1996 |

OTHER PUBLICATIONS

PCT International Search Report and Written Opinion for corresponding PCT Application No. PCT/US2018/056189, dated Jan. 2, 2019, 9 pages.

*Primary Examiner* — Anh V La
(74) *Attorney, Agent, or Firm* — Dority & Manning, P.A.

(57) ABSTRACT

An occupancy sensor includes a housing and one or more sensing elements. The occupancy sensor also includes one or more wireless radios. In addition, the occupancy sensor can include an interface element configured to control activation or deactivation of the one or more wireless radios upon interaction with the interface element.

19 Claims, 14 Drawing Sheets

(56) References Cited

U.S. PATENT DOCUMENTS

2016/0320239 A1 11/2016 Yoon
2017/0105269 A1 4/2017 Balasubramainian et al.
2017/0245346 A1 8/2017 Betourney et al.

* cited by examiner

WIRELESS RADIO CONTROL FOR SENSORS

PRIORITY CLAIM

The present application is based on and claims priority to U.S. Provisional Application No. 62/576,332, titled "Wireless Radio Control for Sensors," having a filing date of Oct. 24, 2017, which is incorporated by reference herein.

FIELD

The present disclosure relates generally to wirelessly programmable sensors.

BACKGROUND

Sensors can be used in conjunction with a variety of systems to provide enhanced control functionality. Occupancy sensors can be used, for instance, to detect the presence of a person in a space. Signals indicative of the presence of a person in a space can be provided to a control device to implement various control actions based on the presence of a person in the space. For instance, signals indicative of the presence of a person in a space can be used to control illumination of one or more light sources in the space. As an example, a control device can control a lighting fixture to illuminate a space when an occupancy sensor provides a signal indicative of the presence of a person in the space.

Sensors, such as occupancy sensors, can include one or more wireless radios. The one or more wireless radios can be used to send and receive information from the sensor. For instance, the one or more wireless radios can be used to send configuration information to configure one or more programmable settings of the sensor.

SUMMARY

Aspects and advantages of embodiments of the present disclosure will be set forth in part in the following description, or may be learned from the description, or may be learned through practice of the embodiments.

In an example embodiment, an occupancy sensor includes a housing and one or more sensing elements. The occupancy sensor can include one or more wireless radios. The occupancy sensor can include an interface element configured to control activation or deactivation of the one or more wireless radios upon interaction with the interface element.

Other examples aspects of the present disclosure are directed to apparatus, electronic devices, non-transitory computer-readable media, and systems for activation and/or deactivation of one or more wireless radios.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
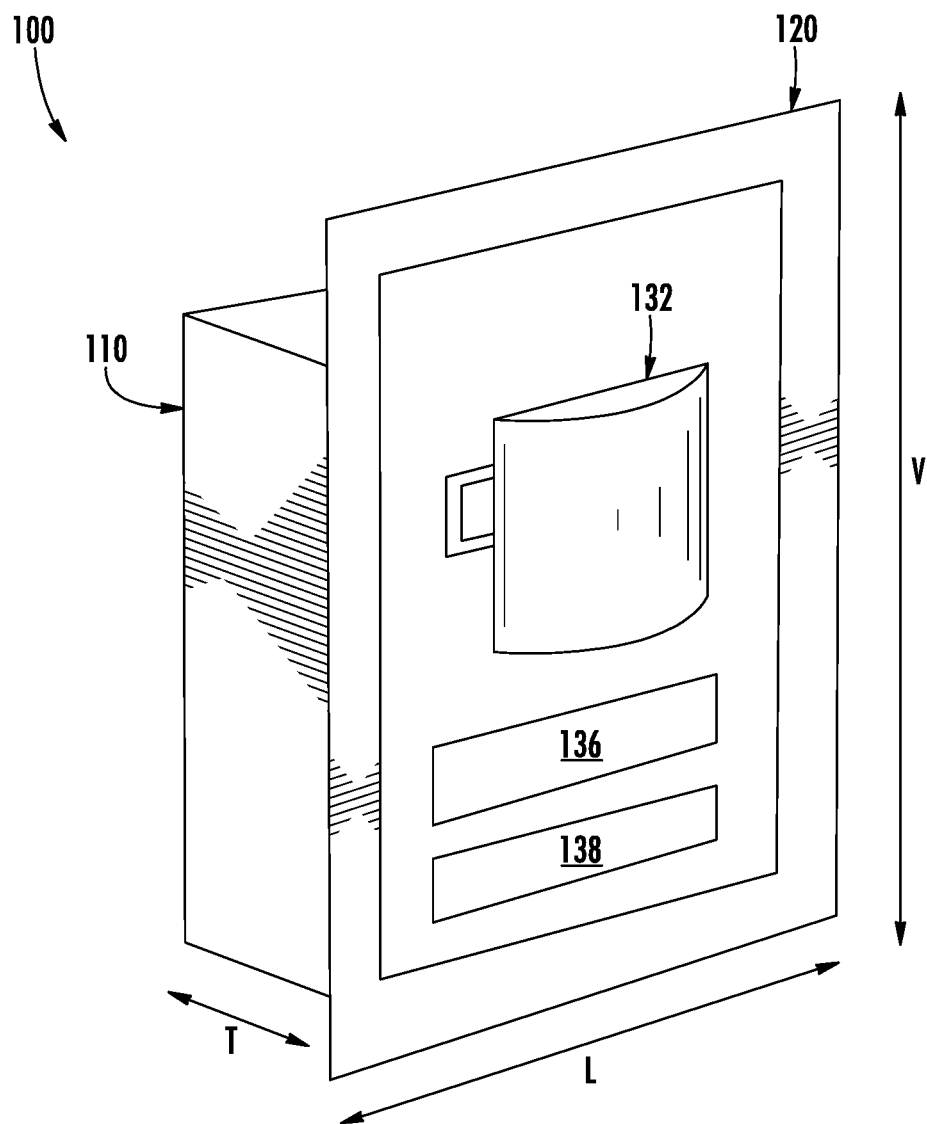
FIG. 1 depicts a perspective view of an occupancy sensor according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to wirelessly programmable sensors. A wirelessly programmable sensor can include one or more wireless radios or other communications interface that can be used to send and receive information. For instance, the one or more wireless radios can be used to receive configuration information from a remote device (e.g., smartphone, tablet, wearable device, laptop, computing device, mobile device, etc.) to configure one or more programmable settings of the wirelessly programmable sensor.

When the wireless radio activated, the wirelessly programmable sensor can communicate with other devices on a wireless network or communications link. In some instances, this can be a nuisance because other devices on the wireless network can inadvertently connect to the wireless programmable sensor via the wireless network. As one example, data indicative of a wireless link associated with a wirelessly programmable sensor can be displayed as an available wireless connection link or network in a user interface associated with a user device. In addition, unauthorized users may be able to gain access to the wirelessly programmable sensor and alter one or more configuration settings of the wirelessly programmable sensor and/or access other devices connected to the sensor.

According to example aspects of the present disclosure, a wirelessly programmable sensor, such as an occupancy sensor, can include one or more wireless radios and an interface element. The one or more wireless radios can be used to establish a wireless communication link with one or more remote devices (e.g., via a Bluetooth connection or other protocol). The interface element can be used to activate and/or deactivate the one or more wireless radios. For instance, a technician or other user can approach the occupancy sensor and activate the one or more wireless radios by interacting with the interface element. Once the one or more wireless radios are activated, the technician or other user can link a computing device with the occupancy sensor, for instance, over a wireless link. The technician or other user can send instructions to the wirelessly programmable sensor via a wireless link between the wireless radio and the computing device. For instance, the technician or other user can program one or more configuration settings for the wirelessly programmable sensor.

According to example aspects of the present disclosure, the one or more wireless radios can be deactivated once the technician or other user has completed the task of programming the sensor. For instance, the one or more wireless radios can be automatically deactivated after a period of time. Alternatively or additionally, the technician or other user can interact with the interface element to deactivate the one or more wireless radios. In this way, unauthorized access to the programmable sensor can be reduced.

In some embodiments, the occupancy sensor can include a passive infrared (PIR) sensor and a PIR lens. The interface element can be associated with the PIR lens. For instance, the interface element can be the PIR lens. As an example, a technician or other user can move the PIR lens between at least a first position and a second position to activate and/or deactivate the one or more wireless radios. When the PIR lens is in the first position, the one or more wireless radios can be activated so that the technician or other user can use a computing device to send instructions to the occupancy sensor via a wireless link between the computing device and the one or more wireless radios. Once the technician or other user is finished sending instructions to the occupancy sensor, the technician or other user can move to the PIR lens to the second position to deactivate the one or more wireless radios.

In some implementations, the technician or other user can press the PIR lens inwards towards a housing of the occupancy sensor to activate or deactivate the one or more wireless radios. For instance, a control device associated with the occupancy sensor can be configured to activate or deactivate the one or more wireless radios when the technician or other user presses the PIR lens inward towards the housing. More specifically, the control device can be configured to activate or deactivate the one or more wireless radios when the technician or other user presses the PIR lens inwards towards the housing for a predetermined amount of time. As an example, the control device can be configured to activate or deactivate the one or more wireless radios when the technician or other user presses the PIR lens inwards towards the housing for about 5 seconds. As used herein, the use of the term "about" in conjunction with a numerical value is intended to refer to within 20% of the stated numerical value.

In some implementations, the interface element can include a shroud movable between a first position and a second position to activate or deactivate the one or more wireless radio. For example, the one or more wireless radios can be activated when the shroud is in the first position and deactivated when the shroud is in the second position. More specifically, when the shroud is in the first position, the shroud can cover the PIR lens. When the shroud is in the second position, the shroud can be spaced apart from the PIR lens so that the shroud does not cover the PIR lens.

In some implementations, the interface element can include a faceplate. The faceplate can be positioned at a front portion of the housing. The faceplate can be movable between a first position and a second position. For instance, the faceplate can be movable between the first position and the second position along a vertical direction. Alternatively, the faceplate can be movable between the first position and the second position along a transverse direction that is substantially perpendicular to the vertical direction. The one or more wireless radios can be activated when the faceplate is in the first position and deactivated when the faceplate is in the second position.

In some implementations, the interface element can include a near field communication (NFC) reader configured to detect one or more devices within a predetermined proximity of the occupancy sensor. When the NFC reader detects a first signal from a device within the predetermined proximity, a control device can be configured to activate the one or more wireless radios. The control device can be further configured to deactivate the wireless radio after a predetermined amount of time has lapsed since the NFC reader detected the first signal. Alternatively, the control device can be further configured to deactivate the one or more wireless radios when the NFC reader receives a second signal from the device.

In some implementations, the interface element can include an ultrasonic sensor configured to detect an object within a predetermined proximity of the occupancy sensor. When the ultrasonic sensor detects the object, a control device can be configured to activate the one or more wireless radios. In some implementations, the control device can be configured to deactivate the one or more wireless radios after a predetermined amount of time has lapsed since the ultrasonic sensor last detected the object.

In some implementations, the interface element can include a rotary switch movable between at least a first position and a second position to activate and deactivate the wireless radio. For instance, when the rotary switch is in the first position, the one or more wireless radios can be activated. When the rotary switch is in the second position, the one or more wireless radios can be deactivated.

In some implementations, the interface element can include a dual in-line package (DIP) switch movable between a first position and a second position to activate and deactivate the one or more wireless radios. For instance, when the DIP switch is in the first position, the one or more wireless radios can be activated. When the DIP switch is in the second position, the one or more wireless radios can be deactivated.

In some implementations, the interface element can include a radio frequency identification (RFID) tag reader configured to detect a RFID tag. More specifically, the RFID tag reader can be configured to detect the RFID tag within a predetermined proximity of the occupancy sensor. For instance, when the RFID tag reader detects a signal from the RFID tag, a control device associated with the occupancy sensor can be configured to activate the one or more wireless radios. The control device can be further configured to deactivate the one or more wireless radios after a predetermined amount of time has lapsed since the RFID tag reader detected the signal.

In some implementations, the interface element can include a jumper configured to couple a power source to the one or more wireless radios. The jumper can provide power to the one or more wireless radios. A technician or other user can remove the jumper to deactivate the one or more wireless radios.

In some implementations, the interface element can include a fuse. Power can be provided to the one or more wireless radios through the fuse. The technician or other user can remove the fuse to deactivate the one or more wireless radios.

In some implementations, the interface element can include a sensor configured to detect a visual light communication signal. The sensor can be communicatively coupled to a control device configured to activate and deactivate the one or more wireless radios based, at least in part, on the visual light communication signal.

In some implementations, the interface element can include a contact movable between a first position and a second position based on a magnetic field. When the contact is in the first position, the control device can be configured to activate the one or more wireless radios. When the contact is in the second position, the control device can be configured to deactivate the one or more wireless radios.

Aspects of the present disclosure can provide a number of technical effects and benefits. For instance, the wirelessly programmable sensors can be protected against unauthorized users, because the interface element reduces the amount of time the one or more wireless radio are activated. Furthermore, the reduction in the amount of time the one or more wireless radio are activated reduces the likelihood of other devices (e.g., smartphones, tablets, computers, other components, etc.) on the network from inadvertently connecting with the wirelessly programmable sensors.

Example aspects of the present disclosure are discussed with reference to an occupancy sensor for purposes of illustration and discussion. Those of ordinary skill in the art, using the disclosures provided herein, will understand that the present disclosure can be applicable to any suitable wirelessly programmable sensor or device.

Figure 2:
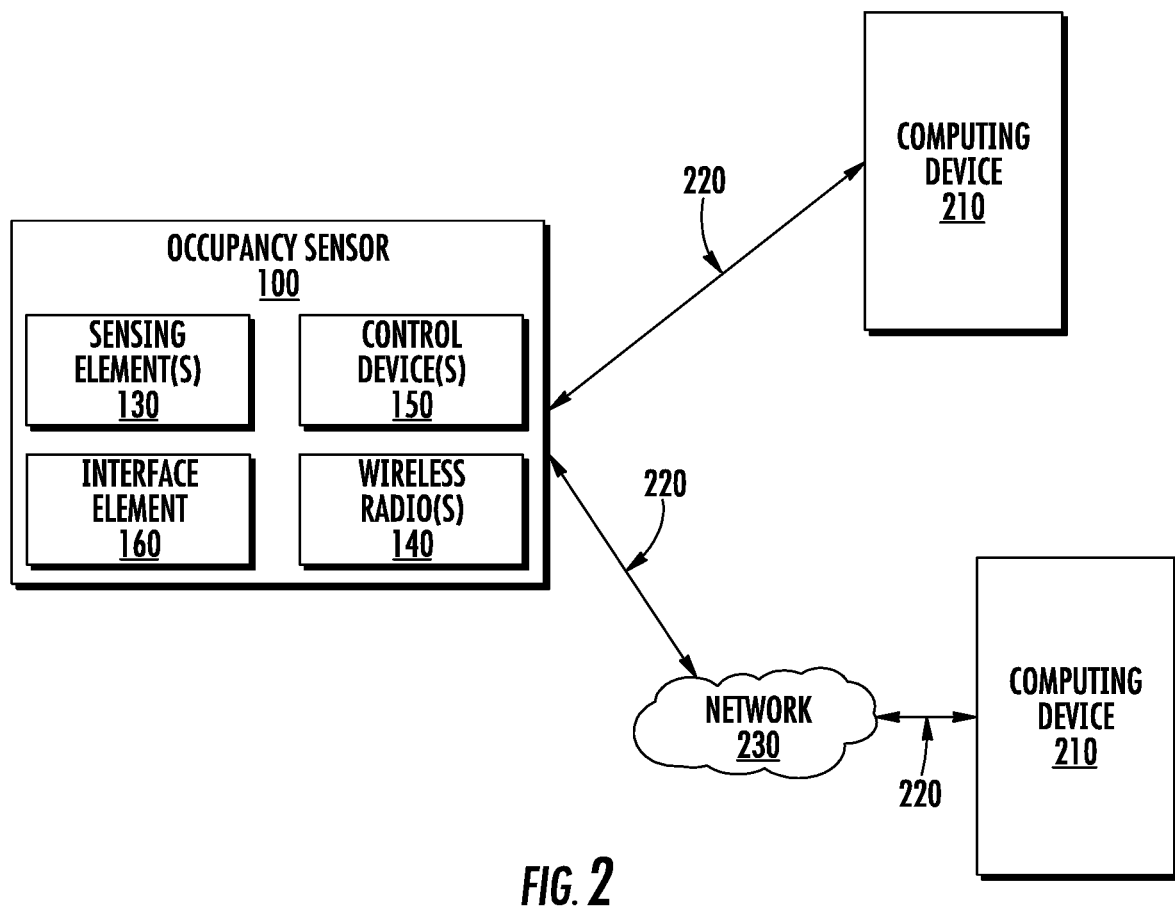
FIG. 2 depicts a block diagram of a system for communicating with an occupancy sensor according to example embodiments of the present disclosure.

Referring now to the FIGS., FIGS. 1 and 2 depict an occupancy sensor 100 according to example embodiments of the present disclosure. The occupancy sensor 100 can define a vertical direction V, a lateral direction L, and a transverse direction T. The vertical direction V, lateral direction L, and transverse direction T are mutually perpendicular to one another and together form an orthogonal coordinate system.

As shown, the occupancy sensor 100 can include a housing 110. In addition, the occupancy sensor 100 can include a faceplate 120. The faceplate 120 can be removably coupled to a front portion of the housing 110 via one or more fasteners. It should be appreciated that the faceplate 120 can be coupled to the front portion of the housing 100 using any suitable type of fastener. For instance, the one or more fasteners can be mechanical fasteners, such as screws.

The occupancy sensor 100 can also include one or more sensing elements 130. In some implementations, the sensing element(s) 130 can be disposed within the housing 110. It should be appreciated that the sensing element(s) 130 can be any suitable type of sensor used to detect occupancy of a space. Example sensing elements 130 can include PIR sensors, ultrasonic sensors, optical sensors, motion sensors, or other suitable sensors configured to detect the presence of an object in a space.

In some implementations, the sensing element(s) 130 can include a passive infrared (PIR) sensor configured to detect motion of one or more objects within a predetermined proximity of the occupancy sensor 100. The occupancy sensor 100 can include a PIR lens 132 (FIG. 4) associated with the PIR sensor. The PIR lens 132 can be used to transmit infrared energy into the space. As shown, the PIR lens 132 can be external to the housing 110. The PIR lens 132 can be shaped to diffuse infrared light emitted by the PIR sensor.

Still referring to FIGS. 1 and 2, the occupancy sensor 100 can include one or more wireless radios 140 to facilitate wireless communication between the occupancy sensor 100 and one or more remote computing devices 210, such as a smartphone. The remote computing device(s) 210 can communicate with the occupancy sensor 100 via a wireless link 220. In some embodiments, the occupancy sensor 100 and the computing device(s) 210 can communicate directly with one another via the wireless link 220.

In alternative embodiments, the occupancy sensor 100 and the computing device(s) 220 can communicate with one another over a network 230. The network 230 can be any suitable type of network. For instance, the network 230 can be any suitable type of network, such as a local area network (e.g., intranet), wide area network (e.g., internet), low power wireless network (e.g., Bluetooth Low Energy (BLE), Zigbee, etc.), or some combination thereof and can include any number of links.

Example communication technologies used in accordance with example aspects of the present disclosure can include, for instance, Bluetooth low energy, Bluetooth mesh networking, near-field communication, Thread, TLS (Transport Layer Security), Wi-Fi (e.g., IEEE, 802.11), Wi-Fi Direct (for peer-to-peer communication), Z-Wave, Zigbee, Halow, cellular communication, LTE, low-power wide area networking, VSAT, Ethernet, MoCA (Multimedia over Coax Alliance), PLC (Power-line communication), DLT (digital line transmission), etc. Other suitable communication technologies can be used without deviating from the scope of the present disclosure.

Figure 3:
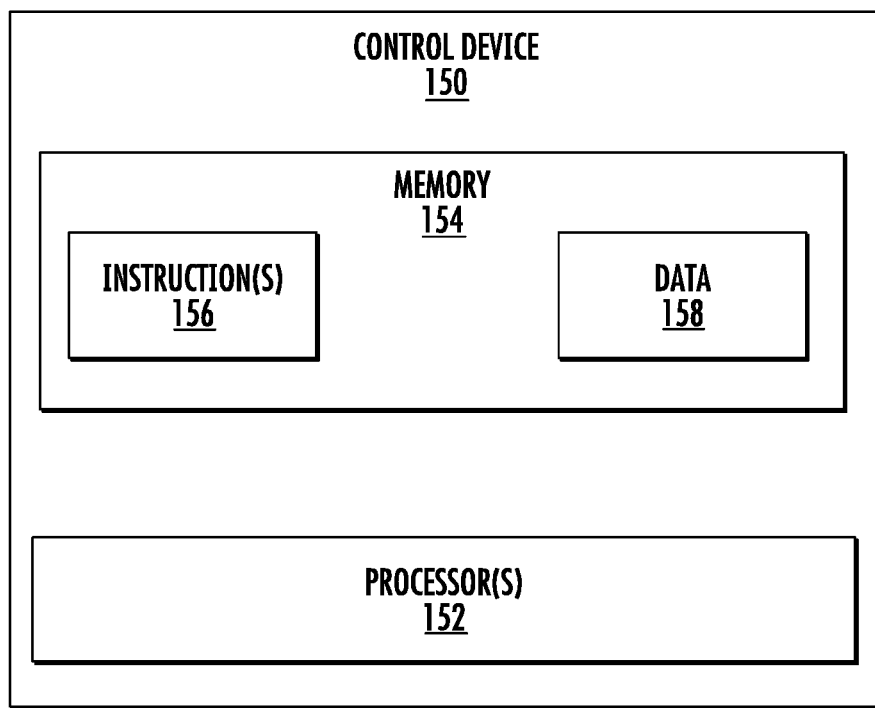
FIG. 3 depicts a block diagram of an example control device according to example embodiments of the present disclosure.

The occupancy sensor 100 can also include one or more control devices 150. As shown in FIG. 3, the control device(s) 150 can include at least one processor 152 and associated memory device 154 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Examples of the memory device 154 can include computer-readable media including, but not limited to, non-transitory computer-readable media, such as RAM, ROM, hard drives, flash drives, or other suitable memory devices.

The memory device 154 can store information accessible by the processor(s) 152, including computer-readable instructions 156 that can be executed by the processor(s) 152. The computer-readable instructions 156 can be any set of instructions that, when executed by the processor(s) 152, cause the processor(s) 152 to perform operations. The computer-readable instructions 156 can be software written in any suitable programming language or can be implemented in hardware. In some implementations, the computer-readable instructions 156 can be executed by the processor(s) 156 to perform operations, such activating or deactivating the one or more wireless radios 140. The memory device 154 can further store data 158 that can be accessed by the control device 150. In example embodiments, the data 158 can include one or more configuration settings for the occupancy sensor 100.

Referring again to FIGS. 1 and 2, the occupancy sensor 100 can include an interface element 160 configured to control activation and/or deactivation of the wireless radio 140. More specifically, a user can approach the occupancy sensor 100 to activate and/or deactivate the wireless radio 140 by interacting with the interface element 160. As will be discussed below, the interface element 160 can be associated with an existing component of the occupancy sensor 100 or, alternatively, can be a standalone component.

Figure 4:
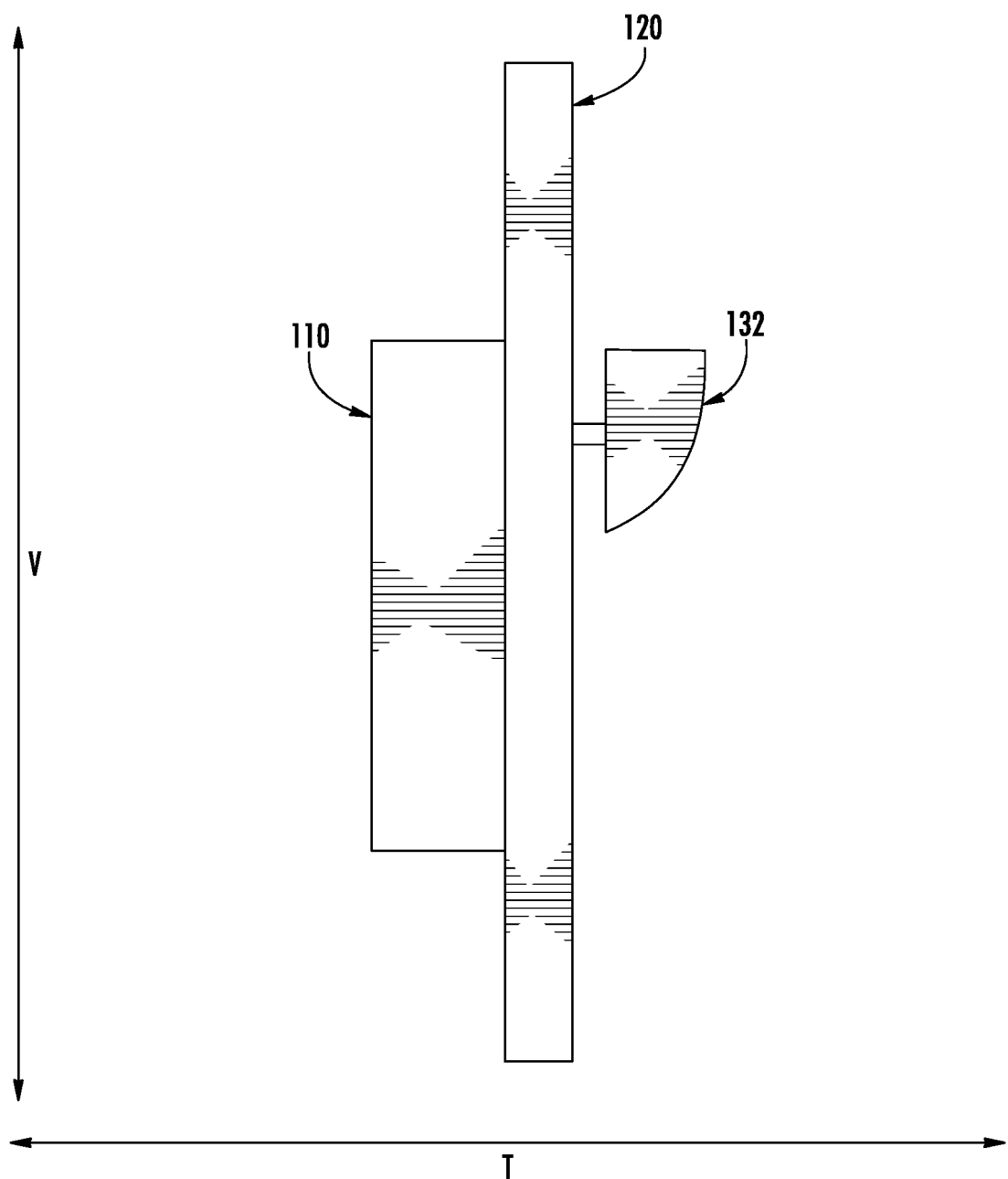
FIG. 4 depicts an interface element of an occupancy sensor in a first position according to example embodiments of the present disclosure.
Figure 5:
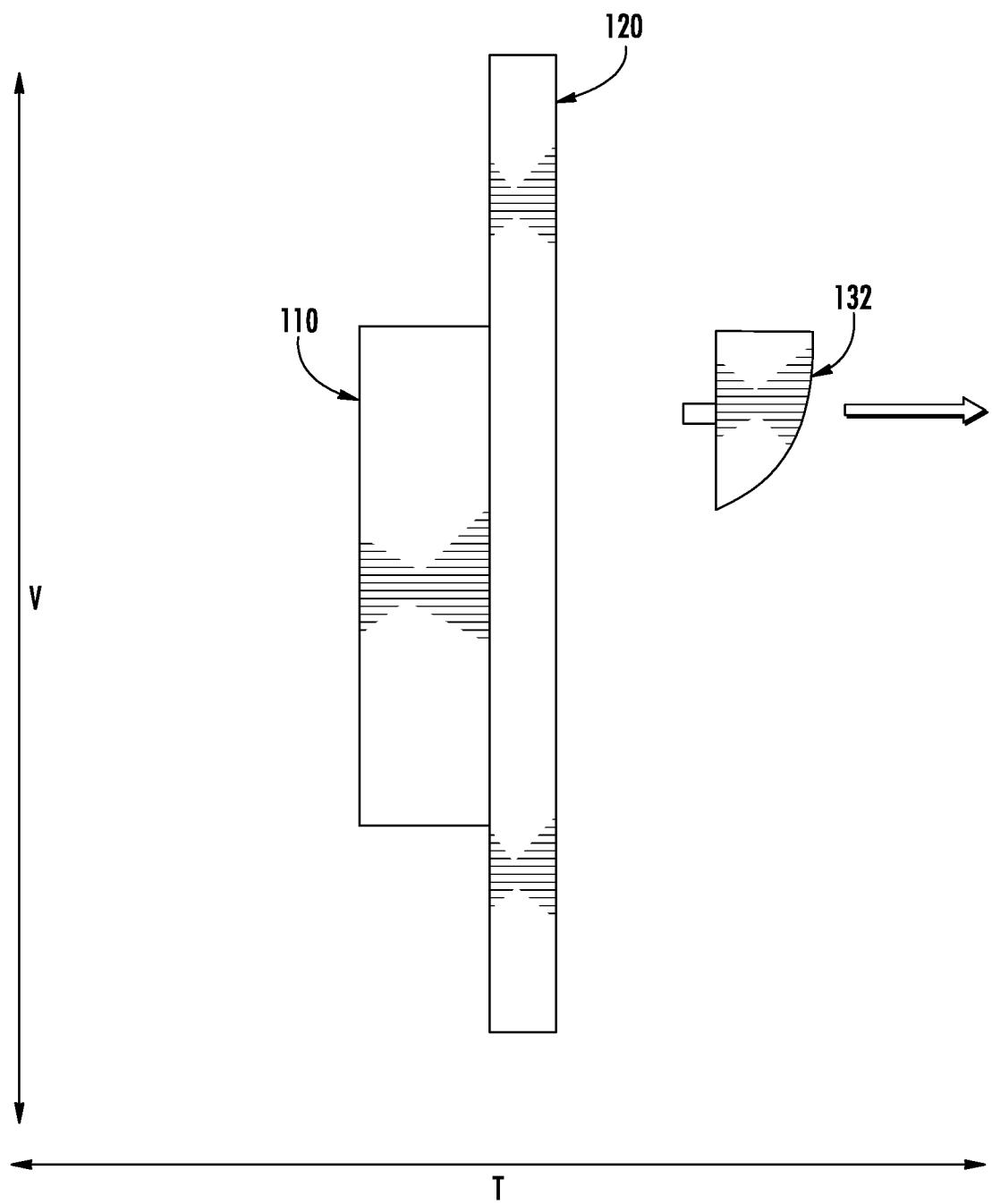
FIG. 5 depicts the interface element of FIG. 4 in a second position according to example embodiments of the present disclosure.

Referring now to FIGS. 2, 4, and 5 in combination, the interface element 160 can be associated with the PIR lens 132. As shown, the PIR lens 132 can be movable between at least a first position (FIG. 4) and a second position (e.g., removed from the faceplate as shown FIG. 5) to activate and/or deactivate the one or more wireless radios 140. For example, the one or more wireless radios 140 can be activated when the PIR lens 132 is moved from the first position to the second position. Once the one or more wireless radios 140 are activated, the computing device(s) 210 and the occupancy sensor 100 can be communicatively coupled to one another.

After the computing device(s) 210 and the occupancy sensor 100 are communicatively coupled to one another, a user can use the computing device(s) 210 to communicate instructions to the occupancy sensor 100. For instance, the user can program one or more configuration settings for the occupancy sensor 100. In some implementations, the one or more configuration settings can include sensitivity or time out settings of the sensing element(s) 130.

In some implementations, communications between the computing device(s) 210 and the one or more wireless radios 140 can be encrypted to provide secure communications between the computing device(s) 210 and the one or more wireless radios 140. More specifically, both the wireless radio(s) 140 and the computing device(s) 210 can be configured to authenticate data. It should be appreciated that the data can be authenticated using any suitable method.

After the user finishes programming the occupancy sensor 100, the user can interact with the PIR lens 132 to deactivate the one or more wireless radio 140. More specifically, the user can move the PIR lens 132 to the first position (FIG. 4). When the PIR lens 132 is in the first position, the control device 150 can be configured to deactivate the one or more wireless radios 140. Alternatively or additionally, one or more power sources can be decoupled from the one or more wireless radios 140 when the PIR lens 132 is in the first position to deactivate the one or more wireless radios 140. In this way, moving the PIR lens 132 to the first position can terminate the communication link between the occupancy sensor 100 and the computing device(s) 210.

Figure 6:
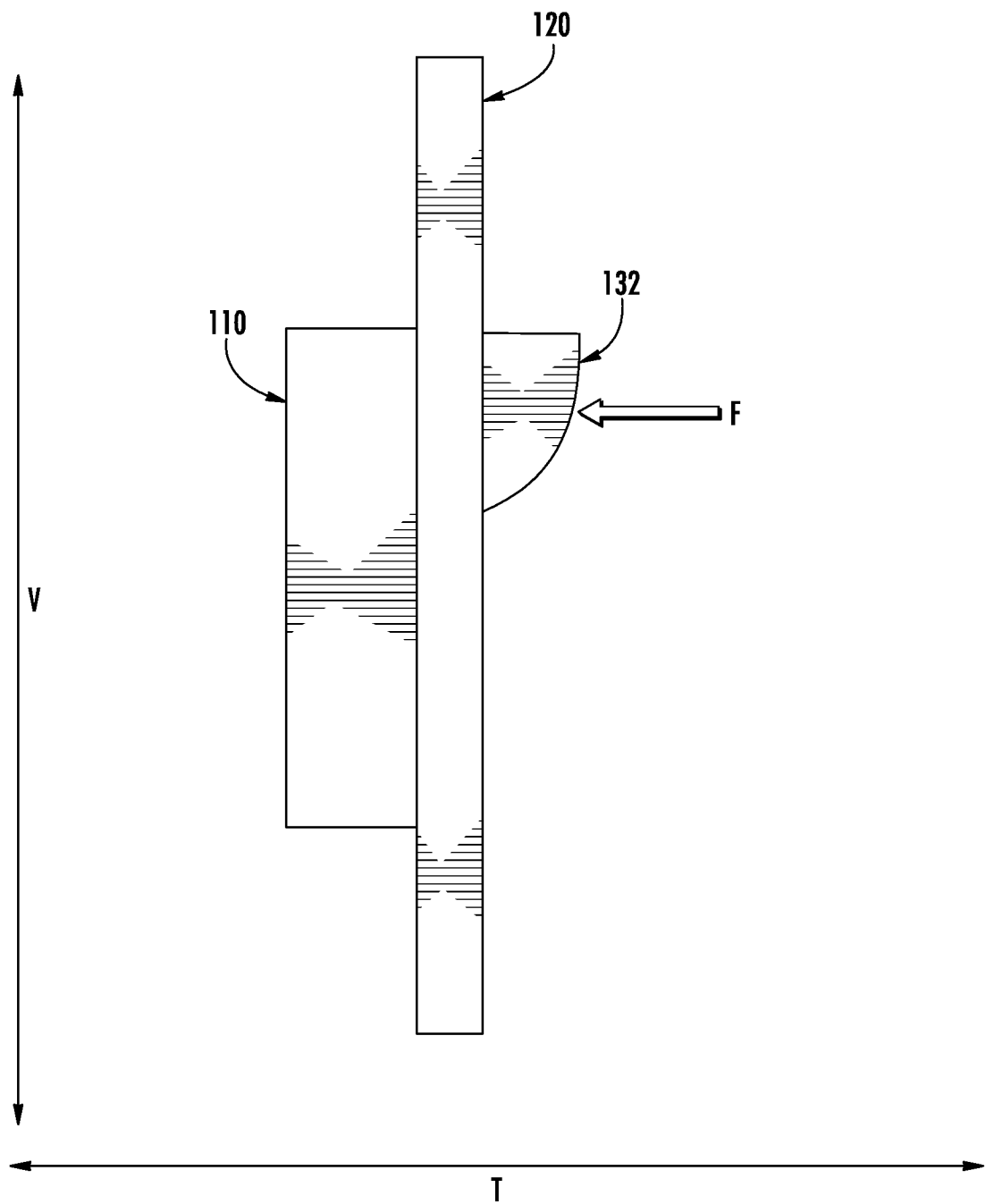
FIG. 6 depicts an interface element of an occupancy sensor according to example embodiments of the present disclosure.

In some embodiments, the PIR lens 132 can be capable of being pressed inward towards the housing 110 of the occupancy sensor 100 to activate and/or deactivate the one or more wireless radios 140 as shown in FIG. 6. For instance, a user can apply a force F to the PIR lens 132. As shown, the force F applied by the user can cause the PIR lens 132 to move along the transverse direction T towards the housing 110 of the occupancy sensor 100. More specifically, the force F can cause the PIR lens 132 to move inward until the PIR lens 132 contacts the faceplate 120.

In some implementations, the control device 150 can be configured to activate and/or deactivate the one or more wireless radios 140 based at least in part on the PIR lens 132 being pressed inward towards the housing 110. For instance, the control device(s) 150 can be configured to activate and/or deactivate the one or more wireless radios 140 each time the PIR lens 132 contacts the faceplate 120. Alternatively, the control device 150 can be configured to activate and/or deactivate the one or more wireless radios 140 each time the PIR lens 132 is pressed inward towards the housing 100 for at least a predetermined amount of time. As an example, the control device(s) 150 can be configured to activate and/or deactivate the one or more wireless radios 140 each time the user presses the PIR lens 132 inwards towards the housing 110 for at least 5 seconds. In this way, the one or more wireless radios 140 cannot be activated or deactivated when a person inadvertently contacts the PIR lens 132 for less than the predetermined amount of time.

In some implementations, a capacitor or other energy storage device is charged when the user presses the PIR lens 132 inward towards the housing 110. The energy stored in the capacitor or energy storage device can be used to power and activate the one or more wireless radios 140. The one or more wireless radios 140 can remain activated for a period of time until the capacitor or energy storage device has discharged to a level no longer sufficient to power the one or more wireless radios 140. When the capacitor or energy storage device has discharged to the level, the one or more wireless radios 140 are deactivated.

Figure 7:
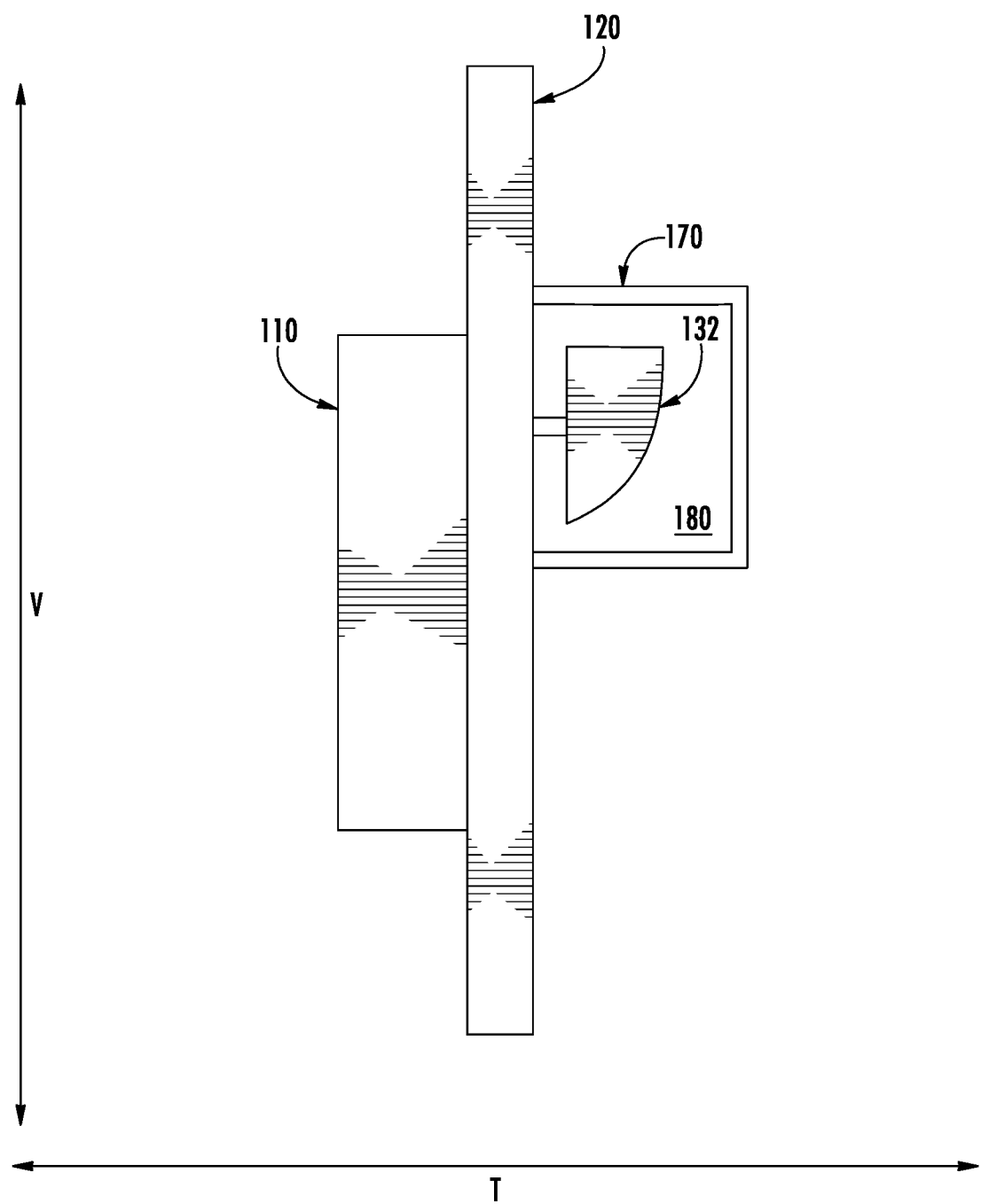
FIG. 7 depicts an interface element of an occupancy sensor in a first position according to example embodiments of the present disclosure.
Figure 8:
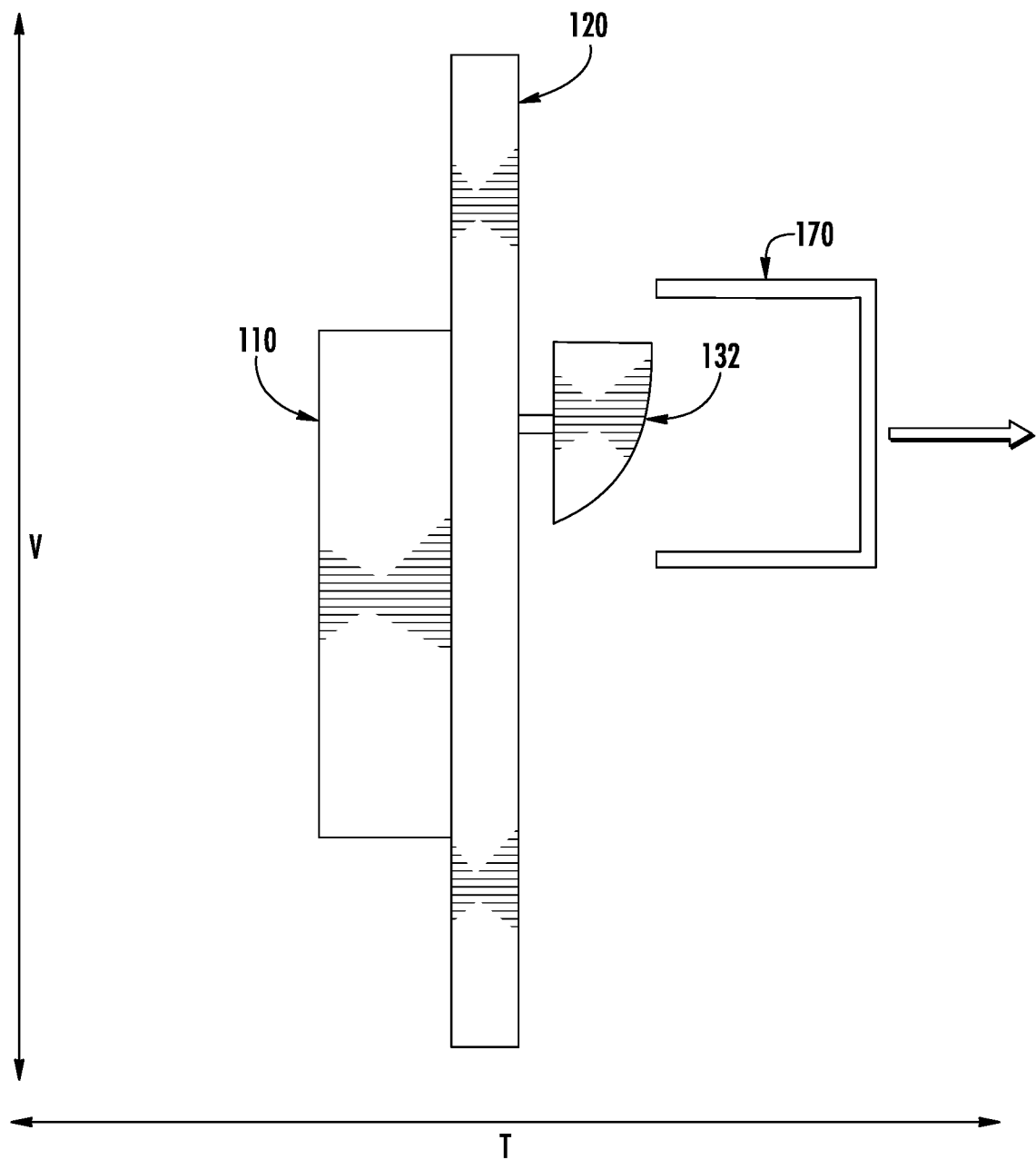
FIG. 8 depicts the interface element of FIG. 7 in a second position according to example embodiments of the present disclosure.

In some embodiments, the interface element 160 can include a shroud 170 as shown in FIG. 7. A user can interact with the shroud 170 to activate and/or deactivate the wireless radio 140. More specifically, the user can move the shroud 170 between a first position (FIG. 7) and a second position (e.g., removed from the faceplate 120 as shown FIG. 8). In some implementations, the user can activate the one or more wireless radios 140 by moving the shroud 170 to the first position (FIG. 7) and deactivate the one or more wireless radios 140 by moving the shroud 170 to the second position (FIG. 8), or vice versa. When the shroud 170 is in the first position, a portion of the shroud 170 can be positioned directly above the PIR lens 132. In addition, a portion of the shroud 170 can contact an exterior surface of the faceplate 120. In this way, the faceplate 120 and the shroud 170 can form an enclosure 180 in which the PIR lens 132 is positioned.

When a user needs to configure one or more settings of the occupancy sensor 100, the user can move the shroud 170 to the first position (FIG. 7). Once the shroud 170 is in the first position, a control device 150 can detect the presence of the shroud 170 via the blockage of PIR signals. In response to detecting the presence of the shroud 170, the control device(s) 150 can be configured to activate the one or more wireless radios 140. When the one or more wireless radios 140 are activated, the user can use the computing device(s)

210 to send instructions to the occupancy sensor 100. Once the user finishes programming the occupancy sensor 100, the user can move the shroud 170 from the first position to the second position. In the second position, the shroud 170 no longer blocks PIR signals. The control device(s) 150 can detect this condition and deactivate the one or more wireless radios 140.

In some implementations, the control device(s) 150 can be configured to deactivate the one or more wireless radios 140 when the shroud 170 is in the second position. Alternatively, the control device(s) 150 can be configured to deactivate the one or more wireless radio 140 after a predetermined amount of time has lapsed since the user moved the shroud 170 from the first position.

In some embodiments, the interface element can be associated with the faceplate 120 of the occupancy sensor 100. For instance, one or more interface elements associated with the faceplate 120 can be manipulated to activate and/or deactivate the one or more wireless radios 140. In some embodiments, the position of the faceplate 120 itself can be manipulated to activate and/or deactivate the one or more wireless radios 140.

Figure 9:
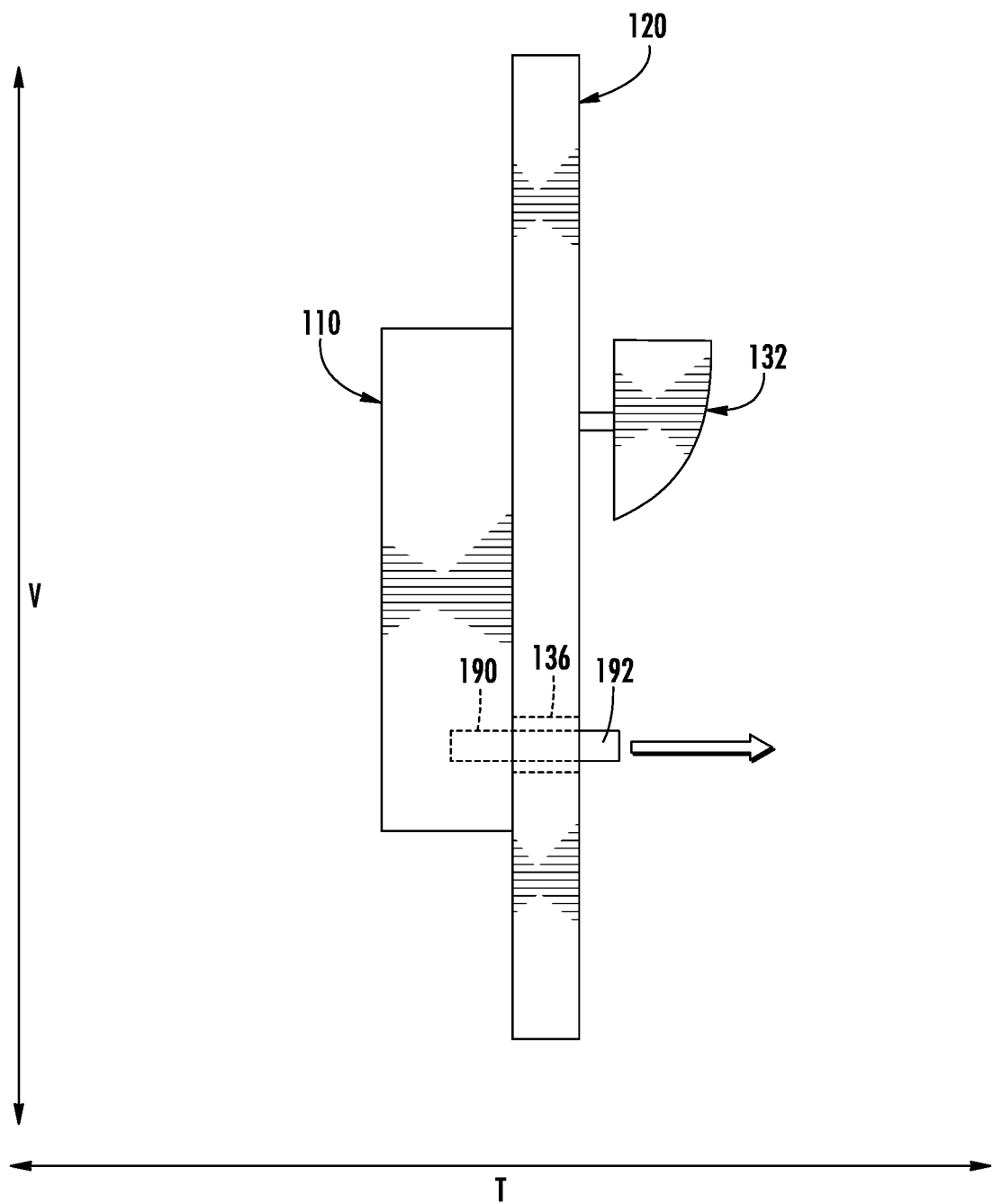
FIG. 9 depicts an interface element of an occupancy sensor in a first position according to example embodiments of the present disclosure.
Figure 10:
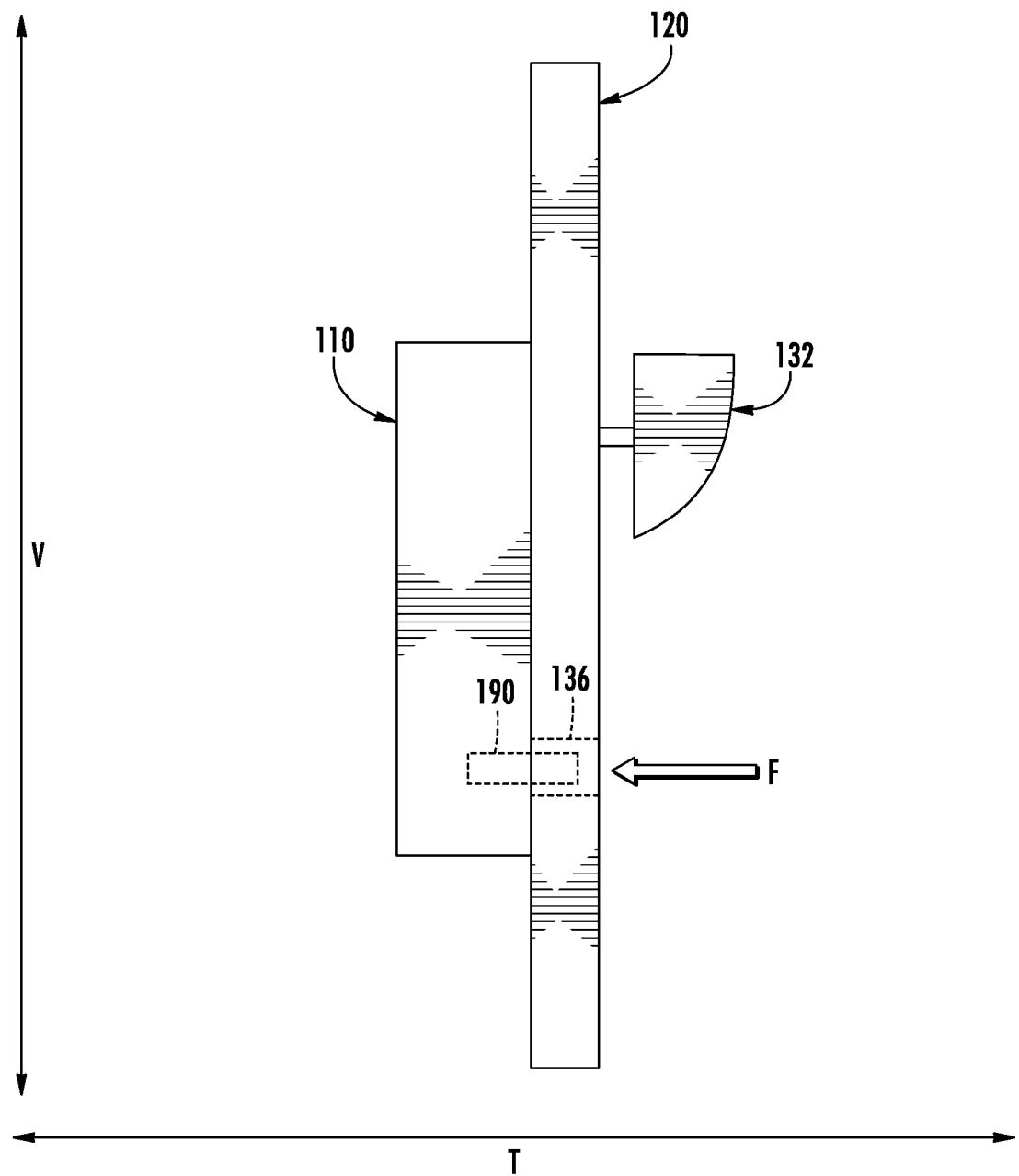
FIG. 10 depicts the interface element of FIG. 9 in a second position according to example embodiments of the present disclosure.

Referring now to FIGS. 9 and 10, the interface element 160 can include a tab 190. As shown, a user can move the tab 190 between a first position (FIG. 9) and a second position (FIG. 10) to activate and/or deactivate the one or more wireless radios 140. When the tab 190 is in the first position, a portion 192 of the tab 190 can be external to the occupancy sensor 100. When the tab 190 is in the second position, the portion 192 of the tab 190 can be positioned within an aperture 136 defined by the faceplate 120.

In some implementations, the tab 190 can be completely removed from the occupancy sensor 100. More specifically, the user can pull the tab 190 outwards away from the housing 110 until the tab 190 is completely removed from the occupancy sensor 100. Once the tab 190 is completely removed, the control device(s) 150 can be configured to permanently deactivate the one or more wireless radios 140. In this way, the occupancy sensor 100 cannot be communicatively coupled with other devices on the network 170, such as the computing device(s) 210 mentioned above with reference to FIG. 2.

Figure 11:
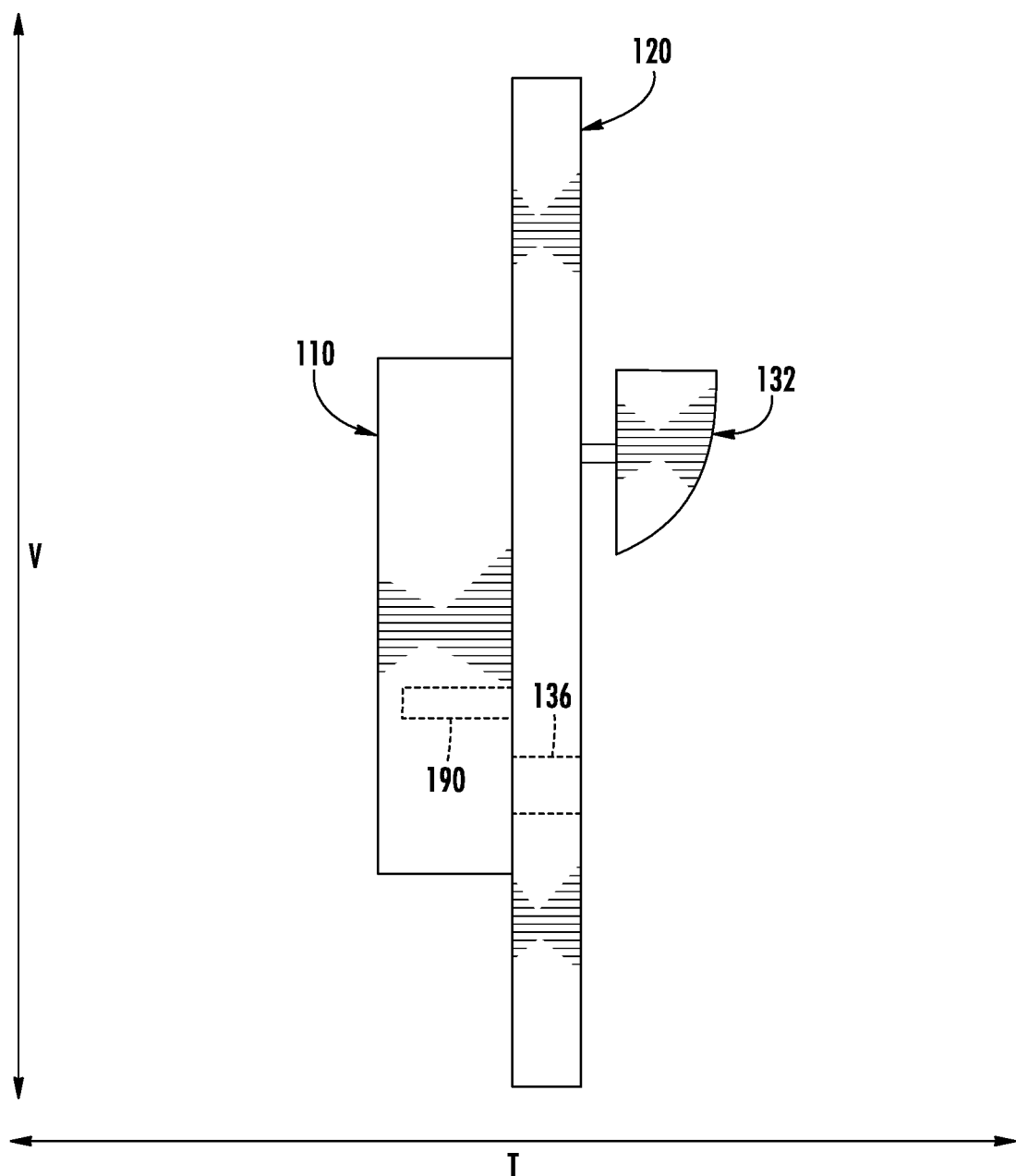
FIG. 11 depicts an interface element of an occupancy sensor in a first position according to example embodiments of the present disclosure.
Figure 12:
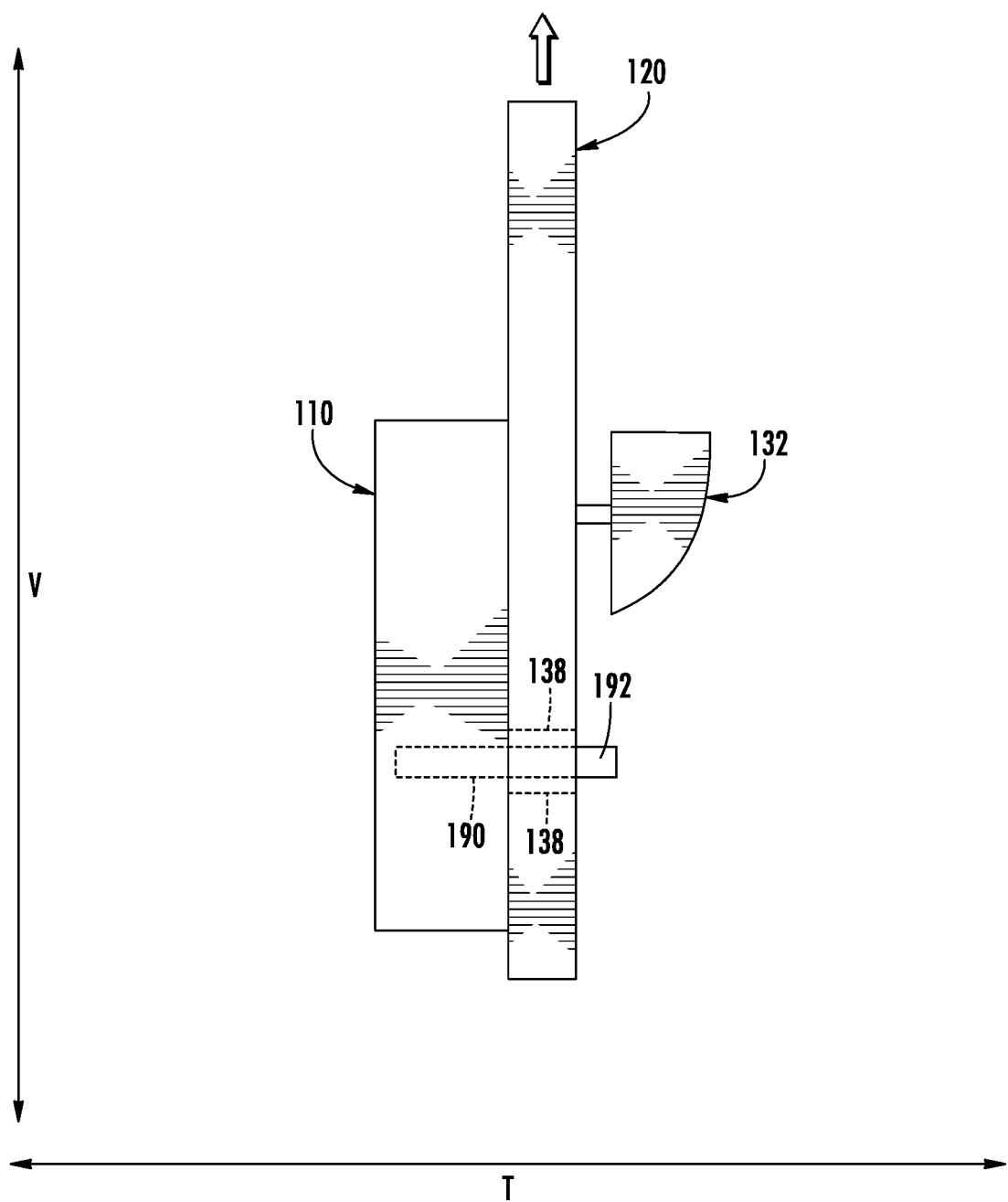
FIG. 12 depicts the interface element of FIG. 11 in a second position according to example embodiments of the present disclosure.

Referring now to FIGS. 11 and 12, in some embodiments, the tab 170 can move between a first position (FIG. 11) and a second position (FIG. 12) based on movement of the faceplate 120 between a first position (FIG. 11) and a second position (FIG. 12). For instance, when the faceplate 120 is in the first position, the faceplate 120 can retain the tab 190 in the housing 110. When the faceplate 120 is in the second position, the tab 190 is aligned with an aperture 138 defined by the faceplate 120. In this way, the tab 190 can move from the first position to the second position. More specifically, the tab 190 can extend through the aperture 138 along the transverse direction T so that at least a portion 192 of the tab 190 is visible to the user. In this way, the tab 190 can provide a visual indicator that lets the user know the one or more wireless radios 140 are activated.

Once the user finishes programming the occupancy sensor 100, the user can move both the faceplate 120 and the tab 190 from the second position to the first position. More specifically, the user can move the tab 190 inwards along the transverse direction T towards the housing 110 and contemporaneously move the faceplate 120 along the vertical direction V until the tab 190 and the aperture 138 are no longer aligned with one another.

Figure 13:
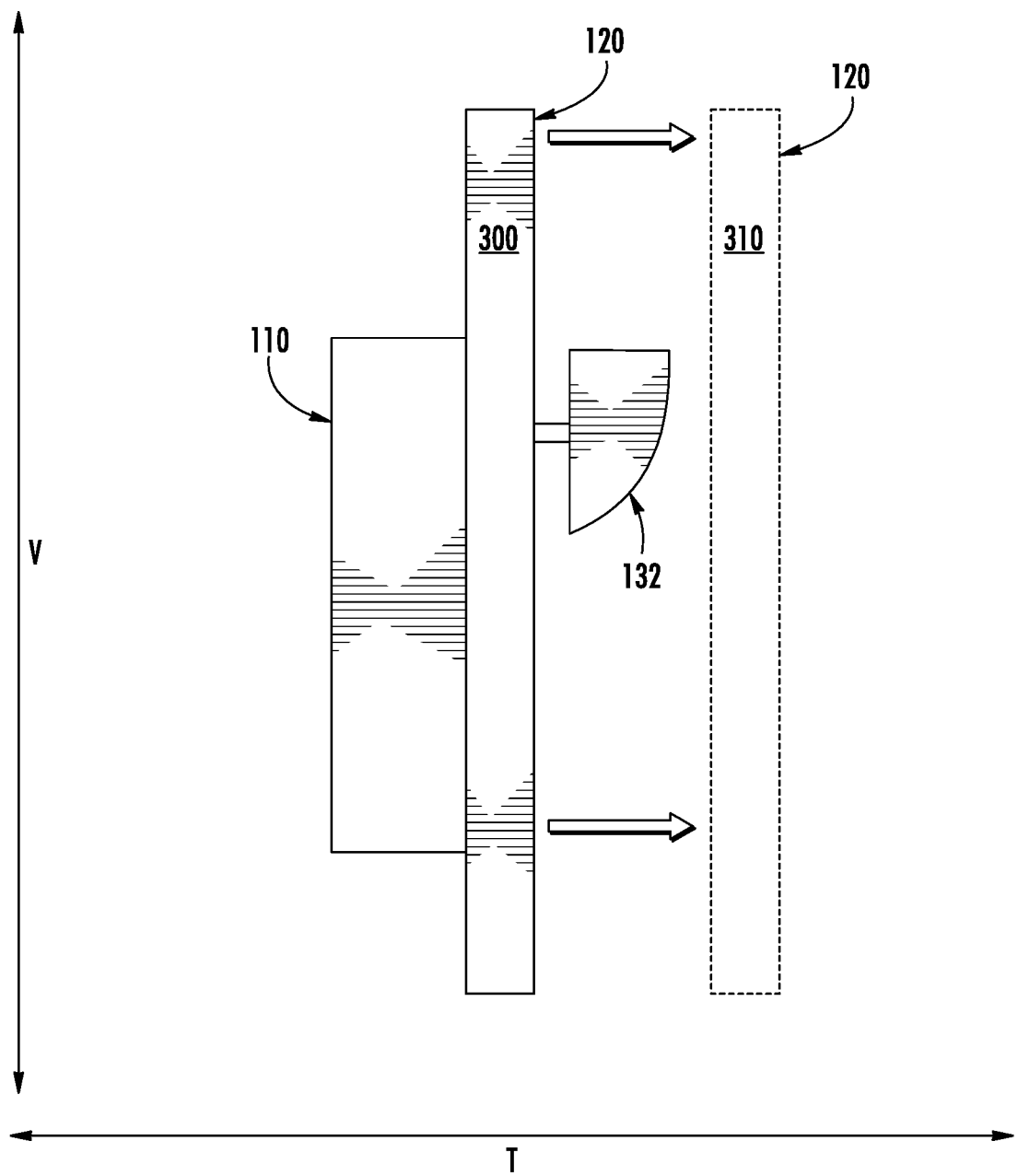
FIG. 13 depicts an interface element of an occupancy sensor according to example embodiments of the present disclosure.

Referring now to FIG. 13, the interface element 160 (FIG. 2) can include the faceplate 120. As shown, the faceplate 120 can move along the transverse direction T between a first position 300 and a second position 310. When the faceplate 120 is in the first position 300, the faceplate 120 can be positioned adjacent to the housing 110 of the occupancy sensor 100. When the faceplate 120 is in the second position 310, the faceplate 120 can be spaced apart from the housing 110 along the transverse direction T. In some implementations, the one or more wireless radios 140 can be activated when a user moves the faceplate 120 form the first position 300 to the second position 310.

Referring again to FIG. 2, the interface element 160 can include other devices and/or mechanisms for activating or deactivating the wireless radio 140. Additional example interface elements 160 will be discussed below in more detail.

For instance, the interface element 160 can include a near field communication (NFC) reader. The NFC reader can be configured to detect one or more devices with NFC capability within a predetermined proximity of the occupancy sensor 100. As an example, when the NFC reader detects a first signal from a device within the predetermined proximity of the occupancy sensor 100, the control device(s) 150 can be configured to activate the one or more wireless radios 140. The control device(s) 150 can be further configured to deactivate the one or more wireless radios 140 after a predetermined amount of time has lapsed since the NFC reader detected the first signal. Alternatively, the control device(s) 150 can be further configured to deactivate the one or more wireless radios 140 when the NFC reader receives a second signal from the device.

In some implementations, the interface element 160 can include an ultrasonic sensor. The ultrasonic sensor can be configured to detect an object within a predetermined proximity of the occupancy sensor 100. When the ultrasonic sensor detects the object, the control device(s) 150 can be configured to activate the one or more wireless radios 140. In some implementations, the control device(s) 150 can be configured to deactivate the one or more wireless radios 140 after a predetermined amount of time has lapsed since the ultrasonic sensor last detected the object.

In some implementations, the interface element 160 can include a rotary switch. The rotary switch can be movable between at least a first position and a second position to activate and deactivate the one or more wireless radios 140. For instance, when the rotary switch is in the first position, the one or more wireless radios 140 can be activated. When the rotary switch is in the second position, the one or more wireless radios 140 can be deactivated.

In some implementations, the interface element 160 can include a dual in-line package (DIP) switch movable between a first position and a second position to activate and deactivate the one or more wireless radios 140. For instance, when the DIP switch is in the first position, the one or more wireless radios can be activated. When the DIP switch is in the second position, the one or more wireless radios 140 can be deactivated.

In some implementations, the interface element 160 can include a radio frequency identification (RFID) tag reader. The RFID tag reader can be configured to detect a RFID tag within a predetermined proximity of the occupancy sensor 100. For instance, when the RFID tag reader detects a signal from the RFID tag, the control device(s) 150 can be configured to activate the one or more wireless radios 140. The control device(s) 150 can be further configured to deactivate the one or more wireless radios 140 after a predetermined amount of time has lapsed since the RFID tag reader detected the signal.

In some implementations, the interface element 160 can include a jumper. More specifically, the jumper can couple a power source to the one or more wireless radios 140. The power source can include, without limitation, an energy storage device (e.g., a battery). In some implementations, a user can disconnect the jumper from the power source to deactivate the one or more wireless radios 140. Alternatively, the user can disconnect the jumper from the one or more wireless radios 140 to deactivate the one or more wireless radios 140. It should be appreciated that removal of the jumper from either the power source or the one or more wireless radios 140 can deactivate the one or more wireless radios 140.

In some implementations, the interface element 160 can include a sensor configured to detect a visual light communication signal. The sensor can be communicatively coupled to the control device(s) 150, which can configured to activate or deactivate the one or more wireless radios 140 based, at least in part, on the visual light communication signal.

As discussed above, in some embodiments, the one or more wireless radios 140 can be deactivated after the expiration of a period of time after activation of the one or more wireless radios 140. This can be accomplished in a variety of manners without deviating from the scope of the present disclosure. For instance, in some embodiments, the control device(s) 150 can be programmed to deactivate the one or more wireless radios 140 after expiration of a timer that is initiated upon activation of the one or more wireless radios 140. In some embodiments, the one or more wireless radios 140 can be powered by a capacitor or other energy storage device upon activation of the one or more wireless radios 140. The one or more wireless radios 140 can be deactivated when the capacitor or other energy storage device discharges to a level no longer sufficient to power the one or more wireless radios 140.

In some embodiments, the interface element 160 can be means for activating or deactivating the one or more wireless radios 140. The means can include one or more aspects of any of the interface elements 160 described herein.

Figure 14:
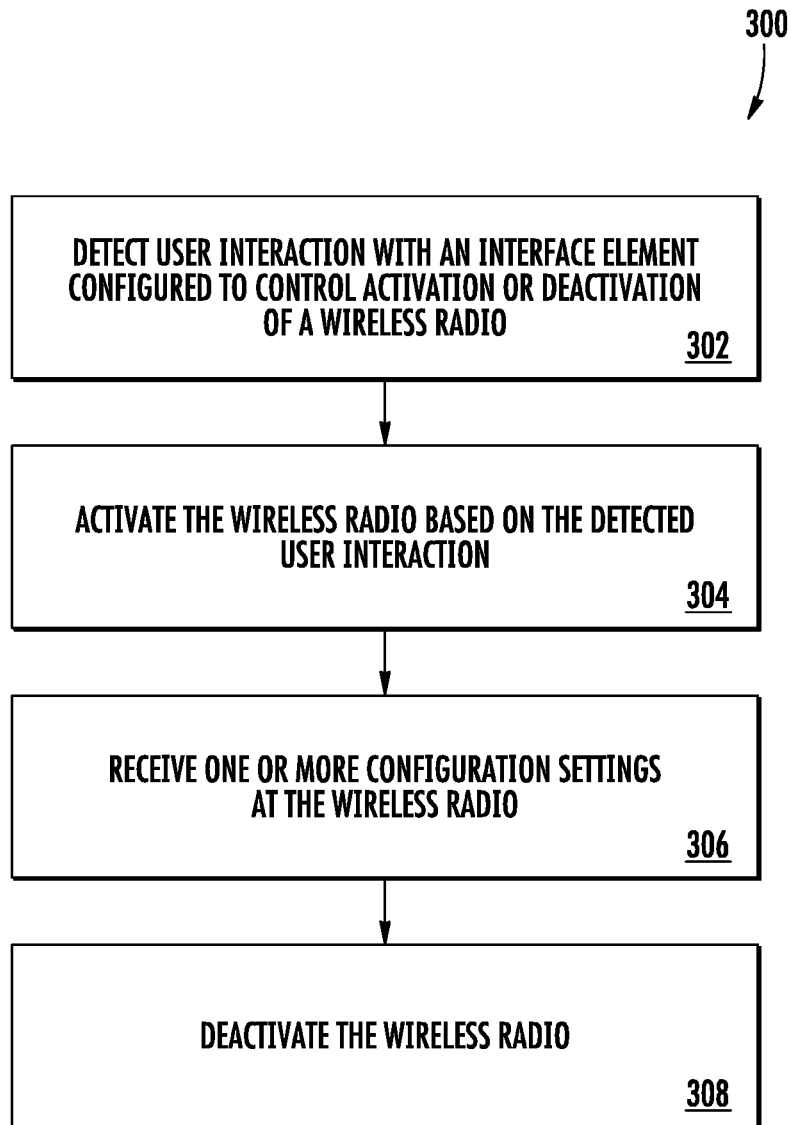
FIG. 14 depicts a flow diagram of a method for configuring a wireless radio of an occupancy sensor according to example embodiments of the present disclosure.

Referring now to FIG. 14, a flow diagram of one example method 300 for activating or deactivating one or more wireless radios of an occupancy sensor is provided according to example embodiments of the present disclosure. In general, the method 300 will be discussed with reference to the occupancy sensor 100 described above with reference to FIGS. 1 through 13. However, it should be appreciated by those of ordinary skill in the art that the disclosed method 300 can generally be implemented with occupancy sensors having any other suitable configuration. In addition, although FIG. 14 depicts steps performed in a particular order for purposes of illustration and discussion, the method discussed herein can be omitted, rearranged, combined, and/or adapted in various ways without deviating from the scope of the present disclosure.

At (302), the method 300 can include detecting user interaction with an interface element configured to control activation or deactivation of the one or more wireless radios. When user interaction is detected, the method 300 can proceed to (304).

At (304), the method 300 can include activating the wireless radio. When the wireless radio is activated, the one or more wireless radios can communicate with other devices. For instance, the one or more wireless radios can communicate with a computing device via a wireless communications link. When the one or more wireless radios are activated, the method 300 can proceed to (306).

At (306), the method 300 can include receiving, at the one or more wireless radios, one or more configuration settings associated with the occupancy sensor. For instance, the one or more configuration settings can be associated with one or more sensing elements of the occupancy sensor. When the sensing elements are configured, the method 300 can proceed to (308).

At (308), the method 300 can include deactivating the one or more wireless radios. When the one or more wireless radios are deactivated, the one or more wireless radios can no longer communicate with other devices, such as computing devices used to communicate one or more configuration settings associated with the occupancy sensor.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An occupancy sensor, comprising:
   a housing;
   one or more sensing elements;
   one or more wireless radios; and
   an interface element configured to control activation or deactivation of the one or more wireless radios upon interaction with the interface element,
   wherein when the one or more wireless radios are activated, the one or more wireless radios receive data indicative of one or more configuration settings for the one or more sensing elements.

2. The occupancy sensor of claim 1, wherein the interface element comprises a near field communications reader.

3. The occupancy sensor of claim 2, wherein when the near field communication reader detects a first signal from a device within a predetermined proximity of the occupancy sensor, a control device is configured to activate the one or more wireless radios to provide communication between the device and the occupancy sensor.

4. The occupancy sensor of claim 3, wherein the control device is configured to deactivate the one or more wireless radios after a predetermined amount of time has lapsed since the near field communication reader detected the first signal.

5. The occupancy sensor of claim 3, wherein when the near field communication reader detects a second signal from the device, the control device is configured to deactivate the one or more wireless radios.

6. The occupancy sensor of claim 1, wherein the interface element comprises a contact movable between a first position and a second position based on a magnetic field.

7. The occupancy sensor of claim 6, wherein:
   when the contact is in the first position, a control device is configured to activate the one or more wireless radios; and
   when the contact is in the second position, the control device is configured to deactivate the one or more wireless radios.

8. The occupancy sensor of claim 1, wherein the data indicative of the one or more configuration settings comprise a sensitivity of the one or more sensing elements.

9. An occupancy sensor, comprising:
a housing;
one or more sensing elements disposed within the housing, the one or more sensing elements comprising a passive infrared (PIR) sensing element;
a PIR lens associated with the passive infrared sensing element;
one or more wireless radios communicatively coupled to the one or more sensing elements; and
an interface element associated with the PIR lens, the interface element configured to control activation or deactivation of the one or more wireless radios upon interaction with the interface element,
wherein when the one or more wireless radios are activated, the one or more wireless radios receive data indicative of one or more configuration settings for the one or more sensing elements.

10. The occupancy of sensor of claim 9, wherein the interface element comprises the PIR lens, and wherein the PIR sensor is movable between a first position and a second position.

11. The occupancy sensor of any claim 10, wherein when the PIR lens is in the first position, the one or more wireless radios are activated; and wherein when the PIR lens is in the second position, the one or more wireless radios are deactivated.

12. The occupancy sensor of claim 9, wherein the interface element comprises a shroud movable between a first position and a second position, wherein when the shroud is in the first position, the shroud covers the PIR lens, and wherein when the shroud is in the second position, the shroud is spaced apart from the PIR lens.

13. The occupancy sensor of claim 12, wherein when the shroud is in the first position, a control device is configured to activate the one or more wireless radios.

14. The occupancy sensor of claim 12, wherein when the shroud is moved from the first position to the second position and then returned to the first position, a control device is configured to deactivate the one or more wireless radios.

15. An occupancy sensor defining a transverse direction and a vertical direction, the occupancy sensor comprising:
a housing;
one or more sensing elements disposed within the housing;
one or more wireless radios communicatively coupled to the one or more sensing elements;
a faceplate positioned at a front portion of the housing; and
an interface element associated with the faceplate, the interface element configured to control activation or deactivation of the one or more wireless radios upon interaction with the interface element,
wherein when the one or more wireless radios are activated, the one or more wireless radios receive data indicative of one or more configuration settings for the one or more sensing elements.

16. The occupancy sensor of claim 15, wherein the interface element comprises a tab movable along the transverse direction between at least a first position and a second position.

17. The occupancy sensor of claim 16, wherein when the tab is in the first position, the one or more wireless radio are activated; and wherein when the tab is in the second position, the one or more wireless radios are deactivated.

18. The occupancy sensor of claim 16, wherein the interface element comprises the faceplate, and wherein the faceplate is movable along the transverse direction or the vertical direction between a first position and a second position.

19. The occupancy sensor of claim 18, wherein:
when the faceplate is in the first position, the tab is in the first position and a control device is configured to activate the one or more wireless radios; and
when the faceplate is in the second position, the tab is in the second position and the control device is configured to deactivate the one or more wireless radios.

* * * * *